Dec. 14, 1926.
A. LATHAM
SHAFT BEARING
Original Filed Feb. 12, 1918
1,610,296
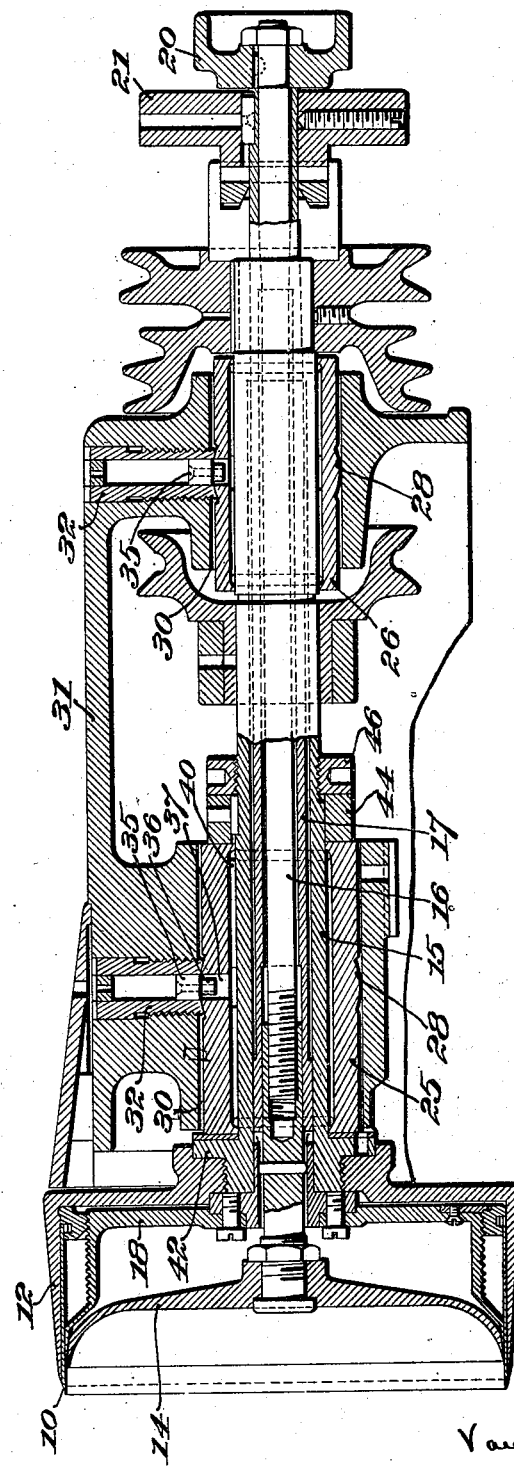

Patented Dec. 14, 1926.

1,610,296

UNITED STATES PATENT OFFICE.

ALBERT LATHAM, OF BEVERLY, MASSACHUSETTS, ASSIGNOR TO UNITED SHOE MACHINERY CORPORATION, OF PATERSON, NEW JERSEY, A CORPORATION OF NEW JERSEY.

SHAFT BEARING.

Original application filed February 12, 1918, Serial No. 216,735. Divided and this application filed February 17, 1920. Serial No. 359,444.

The present invention relates to shaft bearings and more particularly to journal bearings which require accurate alignment with the axis of the shaft.

The subject matter of the present application is divided out from a co-pending application of Latham, Serial No. 216,735, filed February 12, 1918, now Patent No. 1,342,120, granted June 1, 1920, and of which the present application is a division.

It is the object of the present invention to provide a journal bearing of an improved type which may be exactly aligned with the rotary shaft and retained in aligned position.

With this object in view, the several features of the invention consist in certain novel features of construction, combinations and arrangements of parts hereinafter described and claimed, the advantages of which will be obvious to those skilled in the art from the following description.

The accompanying drawing illustrates a longitudinal section in elevation of the improved journal bearing embodied in a machine for skiving leather.

The machine shown in the illustrated embodiment of the invention comprises generally a tubular knife blade 10 which is clamped within an external holder 12 by a clamping head 14. The holder 12 is mounted upon one end of a hollow knife shaft 15 which receives a clamping rod 16 connected with the clamping head 14 and a hollow adjusting rod 17 connected with a threaded adjusting ring 18. The clamping and adjusting rods are provided with actuating members 20 and 21 respectively, located at the opposite end of the machine. This construction forms no part of the present invention and is fully disclosed in the patent hereinbefore set forth.

It is customary to rotate the knife shaft at a high rate of speed and it is accordingly advisable that the bearings for supporting the shaft shall be exactly aligned therewith in order to insure against the slightest binding or cramping of the shaft within the bearings. To this end, each shaft bearing comprises a journal box having provision for a universal swiveling movement with respect to the axis of the shaft, together with means for retaining the journal box in adjusted position. As shown in the drawings, the knife shaft 15 is supported at opposite ends in journal boxes 25 and 26, each of which is provided with a rounded annular bead 28 midway between its ends. The annular bead, which is of slightly greater diameter than the journal box, fits closely within an opening 30 formed in the frame 31 of the machine. With this construction, as may be observed from the drawings, the journal box, as a whole, is held against a bodily transverse movement, but owing to the reduced diameter, is capable of a slight swiveling movement with respect to the axis of the shaft which permits an exact aligning of the journal box with the shaft. In order to firmly retain the journal box in aligned position and prevent endwise movement within the opening, each annular bead 28 is engaged by a retaining member 32 which is threadedly received in an opening formed in the frame 31. The inner end of the retaining member, or plug 32, is curved to conform to the curvature of the bead, and, as shown, the inner end of the retaining member is also slightly less in diameter than the total width of the bead to permit the necessary swiveling movements of the box. It will be obvious to those skilled in the art that when the retaining member is loosened the journal box will tend to align exactly with the shaft and that thereafter the tightening of the retaining member against the bead will firmly hold the journal box in aligned position. The journal box is conveniently retained against rotation with the shaft more particularly when the retaining member is loosened by a pin 35 secured in the inner end of the retaining member and having a reduced neck 36 which projects into a recess 37 formed in the box. As the neck 37 is of substantially smaller diameter than the recess, it does not interfere with the necessary swiveling movements. Although it has been stated above that the retaining members 32 may be tightened so as to hold the boxes in aligned position, it is obvious that the extent to which these members are tightened will be governed by the exigencies of the case and that the pressure of the members upon the boxes may, if desired, be such as to permit the boxes to remain at all times self-aligning.

In order to properly lubricate the rotating shaft, each box is provided with lubricating grooves 40 which are supplied with lubricant from a hollow duct extending completely through the retaining member and pin 35. In the illustrated embodiment of the invention, the journal box 25 which supports that end of the shaft adjacent the skiving knife is considerably larger than the companion box which supports the opposite end of the shaft, but the provision for aligning each box with the shaft is identical. The rotary shaft is retained against longitudinal movement relative to the bearings through the provision of an annular flange 42 and a thrust collar 44 disposed upon opposite sides of the journal box 25. The thrust collar is keyed to the shaft and is prevented from moving longitudinally through a lock nut 46 threaded to the shaft behind the collar. As that portion of the shaft received within the journal box 25 is slightly tapered, it will be evident that the provision of the oppositely disposed flange and thrust collar enables the parts to be so adjusted that all end play or chattering of the shaft is prevented.

Since the openings 30 are made in the solid frame of the machine and the journal boxes 25, 26 are so constructed that they may be pushed into these openings with their rounded ribs 28 fitting closely in said openings, a highly advantageous construction results not only because it facilitates the assembling of the boxes in the frame of the machine without having to separate the parts of a split casing, but because the holes or openings can be made very readily and with great accuracy.

While it is preferred to employ the specific combination and arrangement of parts shown and described, it will be understood that this construction and arrangement is not essential except so far as specified in the claims, and may be changed or modified without departing from the broader features of the invention.

The invention having been described, what is claimed is:

1. A shaft bearing comprising a journal box having on its periphery a projecting rounded portion, a solid one-piece supporting member provided with a cylindrical opening the inner surface of which is smooth and the diameter of which is such that the rounded portion of the box fits closely in it, whereby the journal box may be slid into and out of the opening, and a retaining plug extending through one wall of the solid supporting member into contact with the rounded portion.

2. A shaft bearing comprising a journal box having a smooth annular bead between its ends of slightly greater diameter than the diameter of the box, a solid one-piece supporting member having a cylindrical opening within which the annular bead fits closely, and a retaining member adapted to contact with the bead and retain the box against swiveling movement.

3. A shaft bearing comprising a solid one-piece supporting member provided with a cylindrical opening, and a journal box having on its periphery a raised portion the surface of which is smooth and rounded, the proportions of the parts being such that the box may be inserted in the supporting member with its rounded portion fitting closely in said opening.

4. A shaft bearing comprising a solid one-piece supporting member provided with a cylindrical opening, a journal box having on its periphery a raised portion the surface of which is smooth and rounded, the proportions of the parts being such that the box may be inserted in the supporting member with its rounded portion fitting closely in said opening, a bore in the supporting member leading into the opening, and a member extending through said bore into contact with the rounded portion of the box.

5. A shaft bearing comprising a journal box having an annular bead midway between its ends of greater diameter than the outer diameter of the box, a supporting member having an opening within which the annular bead fits closely, a plug threaded in the supporting member and having an inner end shaped to engage with the bead and retain the box in adjusted angular position, and a pin extending from the inner end of the plug and received in an opening formed in the box to retain the latter against rotary movement.

6. A mechanism of the character described comprising a shaft having a tapered portion, journal boxes supporting the shaft at opposite ends, one of which is shaped to conform to the tapered portion of the shaft, means for supporting the journal boxes adapted to permit an independent swiveling movement of each box with respect to the axis of the shaft, and means for retaining each box in aligned position with respect to the shaft.

ALBERT LATHAM.